H. F. SCHMIDT.
TRACTOR LINKED TRACK.
APPLICATION FILED FEB. 7, 1917.
1,300,029.
Patented Apr. 8, 1919.
2 SHEETS—SHEET 1.
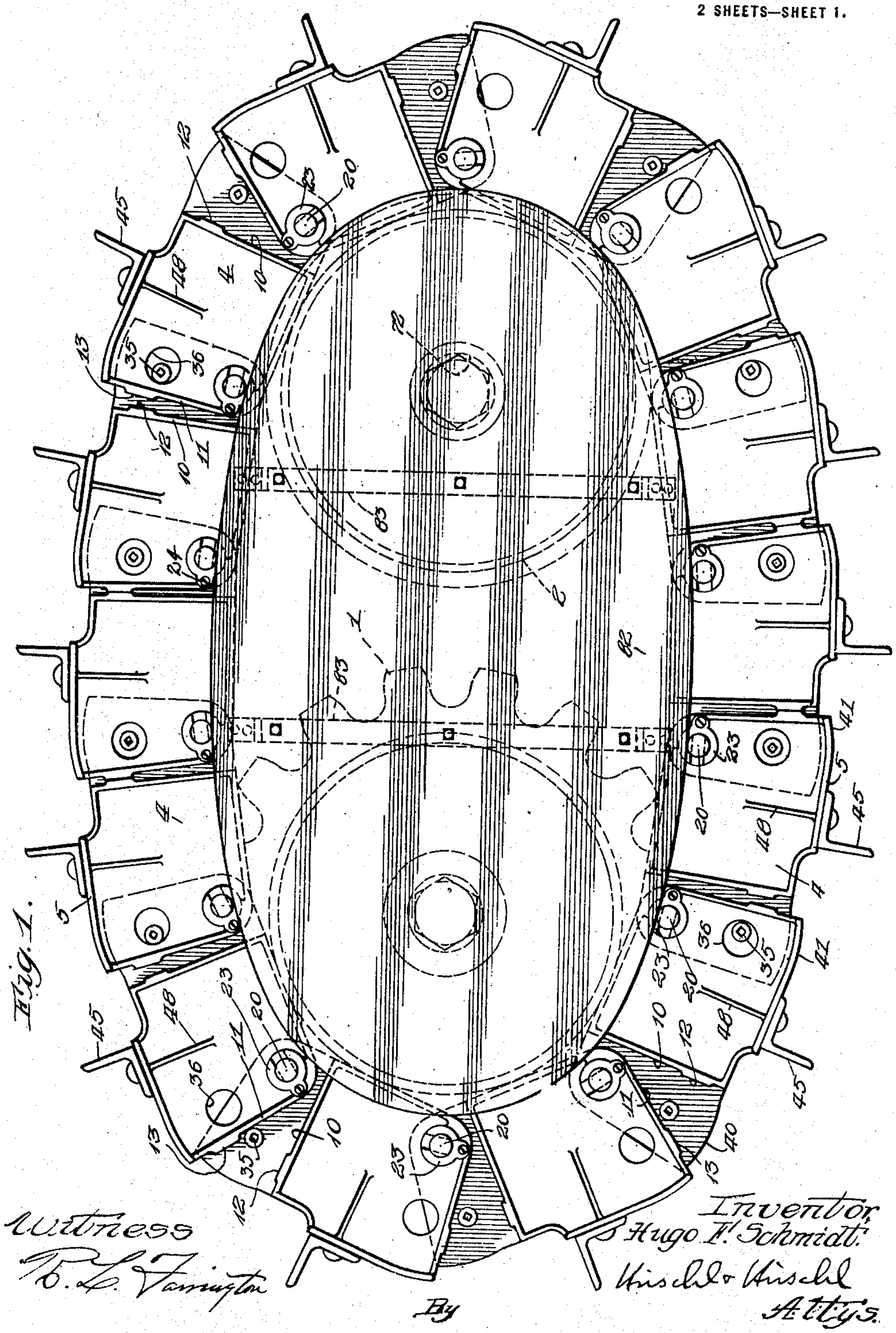

H. F. SCHMIDT.
TRACTOR LINKED TRACK.
APPLICATION FILED FEB. 7, 1917.
1,300,029. Patented Apr. 8, 1919.
2 SHEETS—SHEET 2.
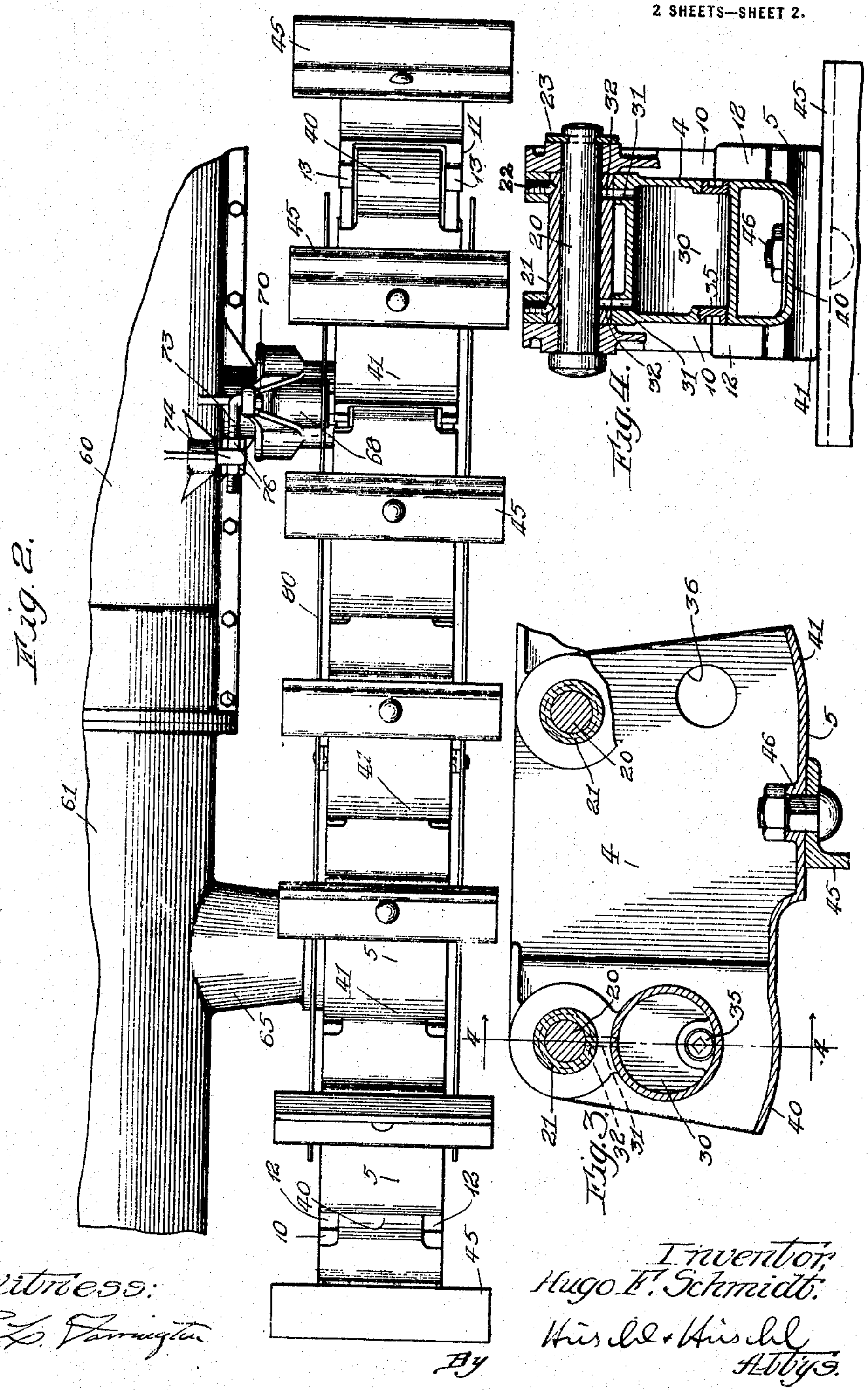
Witness:
Inventor:
Hugo F. Schmidt.
By Hirschl & Hirschl
Attys.

UNITED STATES PATENT OFFICE.

HUGO F. SCHMIDT, OF CHICAGO, ILLINOIS.

TRACTOR LINKED TRACK.

1,300,029. Specification of Letters Patent. Patented Apr. 8, 1919.

Application filed February 7, 1917. Serial No. 147,096.

*To all whom it may concern:*

Be it known that I, HUGO F. SCHMIDT, a citizen of the United States, residing in the city of Chicago, in the county of Cook and State of Illinois, have invented new and useful Improvements in Tractor Linked Tracks, of which the following is a specification.

This invention relates to improvements in linked tracks, also known as caterpillar drive chains, for tractors and similar machines. Among the objects of the invention are to produce a simple and effective linked drive chain or track capable of supporting a heavy load and of affording traction for a tractor or similar machine without the addition to the machine of unnecessary parts, and also to provide means for effectively lubricating the wearing parts of the drive chain or track in order that their wear may be reduced to a minimum. A linked track or chain embodying the principles of the invention is illustrated in the accompanying drawings, in which:

Figure 1 is a view showing the complete mechanism in side elevation.

Fig. 2 is a top plan view thereof.

Fig. 3 is a radial section through one of the links of the track or chain.

Fig. 4 is an axial section through one of the links taken on the line 4—4 of Fig. 3.

As shown in said drawings, in which are illustrated only the parts relating particularly to the linked track, or caterpillar drive chain mechanism, the latter comprises a sprocket wheel and properly spaced therefrom an idler wheel 2, over which is trained a linked track in the form of an endless chain 3. In this chain each link is made in the general form of a box, with a pair of upright parallel side walls 4 and an integral connecting tread part 5, the link having an open side toward the sprocket wheel to accommodate the sprocket teeth and an end also open. Each link is narrowed at one end to telescope into the open end of the next succeeding link, and the connecting part between the narrow portion and the wide portion forms a shoulder in each side wall to engage against the edge of the opening into the large end of the adjacent link and limit the telescoping movement of one link into another. This edge or shoulder is indicated at 10 where there is also shown a rim or ridge to reinforce and strengthen this part of the link. The meeting edge of the adjacent link is also reinforced and strengthened by a rim 11, and these rims or flanges are thickened at two places indicated respectively at 12 and 13 to form abutments or stops and transmit from one link to another the end thrust resulting from the weight of the load upon the lower supporting part of the chain, and the tractive effort. The links are so designed with relation to these stops that while the chain is free to bend in a circle about the sprocket wheel 1 and the idler wheel 2, its unbending movement is limited; and the weight of the tractor is supported upon a bowed portion of the chain, below the two wheels, which is in effect an inverted arch adapted to resist a force tending to bend the chain up between the two wheels. The overlapping ends of each adjacent pair of links are pinned together by pins 20, each pin being surrounded by a hardened sleeve or bushing 21 which is fixed at its ends in openings through the sides of the inner link, while the pin 20 is fixed at its ends into openings through the walls of the outer link, as shown in Fig. 4, so that the only frictional engagement of one part with another is between the pin 20 and its sleeve 21 and by this means there is prevented any wear upon the edges of the openings through the walls of the two links. The sleeve 21 is made non-rotative with respect to the inner link by means of set screws 22; and the pin 20 is fixed in the walls of the outer link by a slotted plate 23, which latter embraces a grooved part of the projecting outer end of the pin 20 and is fastened to the wall of the link by a screw 24.

In the small end of each link between the two side walls and integral therewith there is formed an oil chamber or reservoir 30 communicating through openings 31 with the sleeve 21 and thence through corresponding openings 32, through the sleeve, with the pivot pin 20; the openings 31 and 32 being adapted to register at a certain point in the bending and unbending movement of each adjacent pair of links so that, in the travel of the chain around the two wheels, the chain pins 20 are lubricated by the successive opening of these oiling openings. Oil is supplied to the oil reservoir in each link through an opening in its side wall which is closed by a removable plug 35, and in the same wall at the opposite end of the link is made a large circular opening 36 to afford access to the plug in the adjacent link at that end.

In order that the links may fit closely into each other as above described each link is made with its narrow end somewhat lower than its wide end, and the end portions of each tread part are cylindrically curved, as indicated respectively at 40 and 41, to allow the necessary bending movement about the pivot pins 20. There is also shown bolted to the tread part of each link a crosswise extending and radially projecting cleat 45 to aid in securing traction; these cleats being detachable and being secured in place by bolts 46, with square shanks to prevent twisting.

The side walls of each link immediately below the driving cleats 45 are strengthened or reinforced by outside radial ribs or flanges 48 to aid in sustaining the weight of the tractor on the links.

The frame of the vehicle, only a part of which is shown here, in Fig. 2, is made substantially in the form shown in my co-pending application No. 101515 filed June 3rd, 1916, and comprises a unitary structure including an engine frame 60 and a gear-set housing 61 joined rigidly to the engine frame, these parts forming the frame of the vehicle. From each side of the gear-set housing 61 project integral tubular extensions 65 forming journal boxes for the two halves of the drive shaft, not shown, which extend through them; and on the ends of the drive shafts are secured the driving sprockets 1.

Between the two wheels 1 and 2 and the frame is fitted a large elliptical guard or shield 80 made simply of a flat plate cut to the required shape and supported upon the projections 65 and 68, as shown in Fig. 2. The outer faces of the two wheels 1 and 2 are similarly covered by a shield or guard 82 parallel to the inner guard 80 and supported from it by bent brackets 83 with their inner ends riveted to the plate 80.

The sprocket wheel 1 is made with its teeth only half the distance apart of the pivot pins in the chain so that each link as it moves around the sprocket engages two teeth. The result is that only half of the teeth are used, and after they have become too far worn for effective use the chain may be taken off and adjusted around the wheel to use the second set of teeth, thus doubling the life of the sprocket.

I claim as my invention:

1. In a linked track for tractors, a number of links arranged in the form of an endless chain, each link being secured through a pivot to an adjacent link, and sealed oil chambers in each link; with restricted outlet passages directly to the corresponding pivots affording the sole means of oil escape from the chambers.

2. In a linked track for tractors a number of links arranged in the form of an endless chain, each link having a large end and a small end and the small end of each link being adapted to telescope into the large end of an adjacent link, a pivot connecting each pair of links, and a sealed oil chamber in the small end of each link adapted to supply oil through a restricted outlet passage directly to its pivot.

3. In a linked track for tractors, a number of links arranged in the form of an endless chain, each link having a small end and a large end, whereby the small end of each link is adapted to telescope into the adjacent large end of the next succeeding link, pivots securing the links together, sealed oil chambers in the small ends of each link, with restricted outlet passages directly to the corresponding pivots affording the sole means of oil escape from the chambers, and corresponding stops on the links to limit the telescoping movement of one into another.

In witness whereof, I have hereunto subscribed my name this 30th day of January, 1917.

HUGO F. SCHMIDT.